(12) United States Patent
Kataoka

(10) Patent No.: US 7,767,108 B2
(45) Date of Patent: Aug. 3, 2010

(54) LIQUID CRYSTAL DISPLAY DEVICE AND METHOD FOR MANUFACTURE OF SAME

(75) Inventor: Shingo Kataoka, Kawasaki (JP)

(73) Assignees: Fujitsu Limited, Kawasaki (JP); AU Optronics Corporation, Hsinchu (TW)

( * ) Notice: Subject to any disclaimer, the term of this patent is extended or adjusted under 35 U.S.C. 154(b) by 1525 days.

(21) Appl. No.: 11/006,250

(22) Filed: Dec. 7, 2004

(65) Prior Publication Data

US 2005/0136196 A1 Jun. 23, 2005

(30) Foreign Application Priority Data

Dec. 18, 2003 (JP) ............................. 2003-420578

(51) Int. Cl.
*C09K 19/00* (2006.01)
*C09K 19/06* (2006.01)
*C09K 19/52* (2006.01)

(52) U.S. Cl. .............................. 252/299.01; 252/299.6; 430/20; 428/1.1; 349/1; 349/187

(58) Field of Classification Search ............ 252/299.01, 252/299.6; 430/20; 428/1.1; 349/1, 187
See application file for complete search history.

(56) References Cited

U.S. PATENT DOCUMENTS 5,540,858 A * 7/1996 Yoshinaga et al. ..... 252/299.01
6,597,425 B2 7/2003 Kadota et al.
6,778,229 B2 8/2004 Inoue et al.
6,825,892 B2 11/2004 Inoue et al.
6,894,741 B2 * 5/2005 Nakanishi et al. ............. 349/93

FOREIGN PATENT DOCUMENTS

| JP | 11-095221 | 4/1999 |
|---|---|---|
| JP | 2001-318383 | 11/2001 |
| JP | 2002-348330 | 12/2002 |
| JP | 2003-177408 | 6/2003 |
| JP | 2003-287755 | 10/2003 |

* cited by examiner

*Primary Examiner*—Geraldina Visconti
(74) *Attorney, Agent, or Firm*—Kratz, Quintos & Hanson, LLP

(57) ABSTRACT

In a method for manufacture of a liquid crystal display device in which a liquid crystal composition is placed between two substrates, after which ultraviolet irradiation is performed to form a liquid crystal layer, a specific polymerizable compound is used, or specific ultraviolet irradiation conditions are adopted, or processing is comprised midway through the ultraviolet irradiation to activate the molecular motion of liquid crystal molecules or to deform the liquid crystal layer. A method for manufacture of a liquid crystal display device and a liquid crystal display device manufactured by this method are provided, in which an alignment control film is rendered unnecessary, and which has such advantages as improved quality of the liquid crystal panel, enhanced production yields, streamlined manufacturing facilities, simplified processes, and reduced costs.

33 Claims, 15 Drawing Sheets

ABOUT 0.1 mm

ABOUT 0.1 mm (a)

(b)

(a)

(b)

(c)

(d)

(a)

(b)

LIQUID CRYSTAL DISPLAY DEVICE AND METHOD FOR MANUFACTURE OF SAME

BACKGROUND OF THE INVENTION

1. Field of the Invention

This invention relates to a liquid crystal display device and a method for manufacture of a liquid crystal display device. In particular, this invention relates to a liquid crystal display device which utilizes a state in which liquid crystal molecules are aligned vertically with no voltage applied, and to a method for manufacture of same.

2. Description of the Related Art

In the prior art, as liquid crystal displays (LCDs) using an active matrix, TN-mode liquid crystal display devices in which liquid crystal material having a positive dielectric constant anisotropy is aligned parallel to the substrate surfaces, and with a 90° twist between the opposing substrates, have been widely employed. However, there is the problem that viewing-angle characteristics are poor when using the TN mode, and so various studies have been conducted in order to improve viewing-angle characteristics.

As an alternative method, the MVA (Multidomain Vertical Alignment) method was developed, in which a liquid crystal material having a negative dielectric constant anisotropy is aligned vertically, and protrusions on the substrate surface and slits in electrodes regulate the direction of inclination of liquid crystal molecules when a voltage is applied; and this method has been successful in greatly improving viewing-angle characteristics.

MVA-method liquid crystal panels are explained using the examples of FIG. 1A, FIG. 1B, and FIG. 2. FIG. 1A and FIG. 1B are schematic perspective views showing the alignment of liquid crystal molecules in the liquid crystal panel of an MVA-method liquid crystal display device; FIG. 2 is a schematic plan view showing the alignment direction of liquid crystal molecules in the liquid crystal panel of an MVA-method liquid crystal display device.

In the liquid crystal panel of this MVA-method liquid crystal display device, the liquid crystal molecules 1 with a negative dielectric constant anisotropy which are between the two glass substrates are aligned vertically as shown in FIG. 1A when no voltage is applied. Pixel electrodes connected to TFTs (thin film transistors, not shown) are formed on one of the glass substrates 2, and a counter electrode is formed on the other glass substrate 3. Uneven portions 4 are formed in alternation on the pixel electrodes and on the counter electrode.

When a TFT is in the off state, that is, when no voltage is applied, liquid crystal molecules are aligned in the direction vertical to the substrate interface, as shown in FIG. 1A. When the TFT is put into the on state, that is, when a voltage is applied, the influence of the electric field causes the liquid crystal molecules to be inclined in the horizontal direction, and due to the structures of the uneven portions, the direction of inclination of the liquid crystal molecules 1 is regulated. As a result the liquid crystal molecules are aligned in a plurality of directions within one pixel, as shown in FIG. 1B. For example, when uneven portions 4 are formed as in FIG. 2, liquid crystal molecules 1 are aligned in each of the directions A, B, C and D. Thus in an MVA-method liquid crystal display device, with a TFT in the on state the liquid crystal molecules are aligned in a plurality of directions, and so satisfactory viewing-angle characteristics are obtained.

In the above MVA method, an alignment control film does not regulate the direction of inclination of liquid crystal molecules. Hence alignment treating processes such as rubbing, which is almost essential for horizontal-alignment methods of which TN is representative, are unnecessary. In terms of processes, this eliminates the problems of static electricity and impurities resulting from rubbing, and so also obviates the need for cleaning processes after alignment processing. Moreover, the problem of irregularities due to scattering in pretilt angles in relation with alignment is also eliminated, and there are also the advantages that processes can be simplified and yields improved, enabling cost reductions.

However, the MVA method requires that an alignment control film itself be installed; and such problems as reduced liquid crystal panel quality due to thickness irregularities when printing the alignment control film, lower yields due to inclusion of foreign matter, the complexity of equipment and processes, increased facility costs, increased material expenses, extended tact times, and other problems of cost increasing due to printing, cannot be avoided. Further, although techniques are known (see for example Japanese Unexamined Patent Application Publication No. 11-95221 (scope of claims)) for the coexistence of cured resins and other polymers which regulate the liquid crystal alignment in the liquid crystal layer, incorporation of such techniques has not advanced to a level at which use of alignment control films has become unnecessary.

Further, while there has been rapid advance toward ultralarge motherglass for the substrates of liquid crystal panels, it is getting more and more difficult to provide equipment to print alignment control film that can accommodate such ultralarge motherglass.

Also, the use of equipment for printing alignment control films is limited to planar shapes, owing to the difficulty in handling film-shape substrates which are thin and flexible.

SUMMARY OF THE INVENTION

An object of this invention is to resolve the above problems and to provide a technique enabling the omission of the process to form an alignment control film prior to the bonding of substrates, which process had previously been regarded as indispensable.

Other objects and advantages of this invention will become clear in the explanation below.

According to one aspect of the invention, a method for manufacture of a liquid crystal display device is provided in which a liquid crystal composition, comprising both liquid crystal molecules and a polymerizable compound which undergoes polymerization under the action of light or a combination of light and heat and which can effect the alignment of liquid crystal molecules in the vertical direction, is placed between two substrates, after which the polymerizable compound is caused to undergo polymerization by irradiation with ultraviolet rays to form a liquid crystal layer; and in which ultraviolet irradiation under a first set of conditions, and ultraviolet irradiation under a second set of conditions for which the rate of polymerization is higher than the ultraviolet irradiation under the first set of conditions, are combined in that order.

It is preferable that, before the ultraviolet irradiation under the first set of conditions, or between the ultraviolet irradiation under the first set of conditions and the ultraviolet irradiation under the second set of conditions, ultraviolet irradiation be performed under a third set of conditions with a lower rate of polymerization than under the first set of conditions, and that the conditions of the ultraviolet irradiation relating to the rate of polymerization be determined in terms of the ultraviolet wavelength, or the ultraviolet intensity, or the temperature, or a combination thereof.

According to another aspect of the invention, a method for manufacture of a liquid crystal display device is provided in which a liquid crystal composition, comprising both liquid crystal molecules and a polymerizable compound which undergoes polymerization under the action of light or a combination of light and heat and which can effect the alignment of liquid crystal molecules in the vertical direction, is placed between two substrates, after which the polymerizable compound is caused to undergo polymerization by irradiation with ultraviolet rays to form a liquid crystal layer; and comprising processing to activate the molecular motion of liquid crystal molecules during ultraviolet irradiation.

It is preferable that the activation processing be heating of the liquid crystal layer to the vicinity of the phase transition point from a liquid crystal state to an isotropic state of the liquid crystal molecules.

According to other aspects of the invention, a method for manufacture of a liquid crystal display device is provided in which a liquid crystal composition, comprising both liquid crystal molecules and a polymerizable compound which undergoes polymerization under the action of light or a combination of light and heat and which can effect the alignment of liquid crystal molecules in the vertical direction, is placed between two substrates, after which the polymerizable compound is caused to undergo polymerization by irradiation with ultraviolet rays to form a liquid crystal layer; and in which the liquid crystal display device comprises processing to deform the liquid crystal layer during the ultraviolet irradiation, or the liquid crystal composition comprises a compound having the structure of the following formula (1).

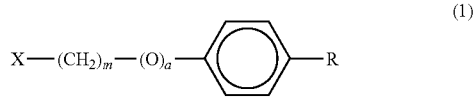

(1)

(Here X is an acrylate group or a methacrylate group; R is an alkyl group or an alkoxy group with the number of carbon atoms between 1 and 18, or one of these groups with a portion of the carbon atoms or hydrogen atoms replaced by other atoms or molecules; a is 0 or 1; and m is an integer between 0 and 2.) In the latter case, it is preferable that a=0 and/or that m=0.

The above aspects can be implemented in combination, so long as there is no contradiction with the objectives of this invention.

In each of the above aspects and combinations thereof, it is preferable that the liquid crystal composition comprise a compound having the structure of formula (2):

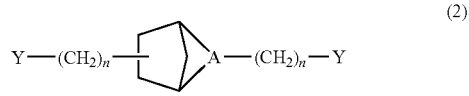

(2)

(here, Y is an acrylate group or a methacrylate group, A is an aromatic ring which may have a substituent, an alicyclic ring which may have a substituent, or a group of an aliphatic chain which may have branches, and n is an integer of 0 or 1); that in this case, n=0; that the distances between spacers determining the distance between substrates be maintained at a value equal to or greater than a prescribed value; that protruding structures provided on a substrate be used as spacers; and that liquid crystal molecules have a negative dielectric constant anisotropy, and have the properties of being aligned substantially vertically when a voltage is not applied and, when a voltage is applied, of being inclined with the direction of inclination regulated by protrusions formed on the substrate or by slits in electrodes.

By means of the above aspects of this invention, the alignment control film, which conventionally has been regarded as indispensable, can be omitted.

According to still another aspect of this invention, a liquid crystal display device manufactured by any of the above manufacturing methods is provided.

By means of this aspect of the invention, quality is improved and design freedom is enhanced.

Through this invention, a process to form an alignment control film prior to substrate bonding, by printing or other means, is rendered unnecessary. Hence numerous advantages are obtained, including improvement of the quality of liquid crystal panels, increases in yields, simplification of manufacturing facilities, streamlining of manufacturing processes, and lowering of costs.

Further, the desired alignment can easily be obtained even for thin, flexible film-shape substrates and for liquid crystal panels that is curved rather than flat, so that liquid crystal display devices with greater freedom of design can be realized.

Further, ultra-large motherglass for the substrates of liquid crystal panels can easily be accommodated.

DESCRIPTION OF THE PREFERRED EMBODIMENTS

Figure 1A:
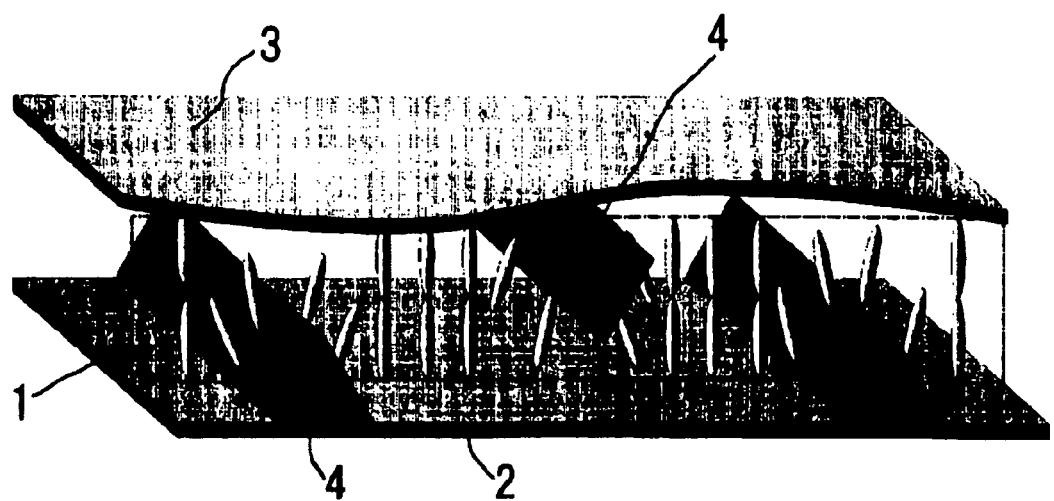
FIG. 1A is a schematic perspective view of an MVA-method liquid crystal panel.
Figure 1B:
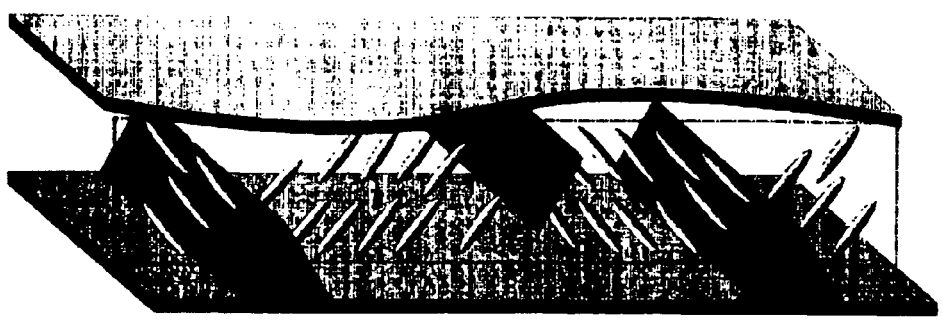
FIG. 1B is a schematic perspective view of an MVA-method liquid crystal panel.
Figure 2:
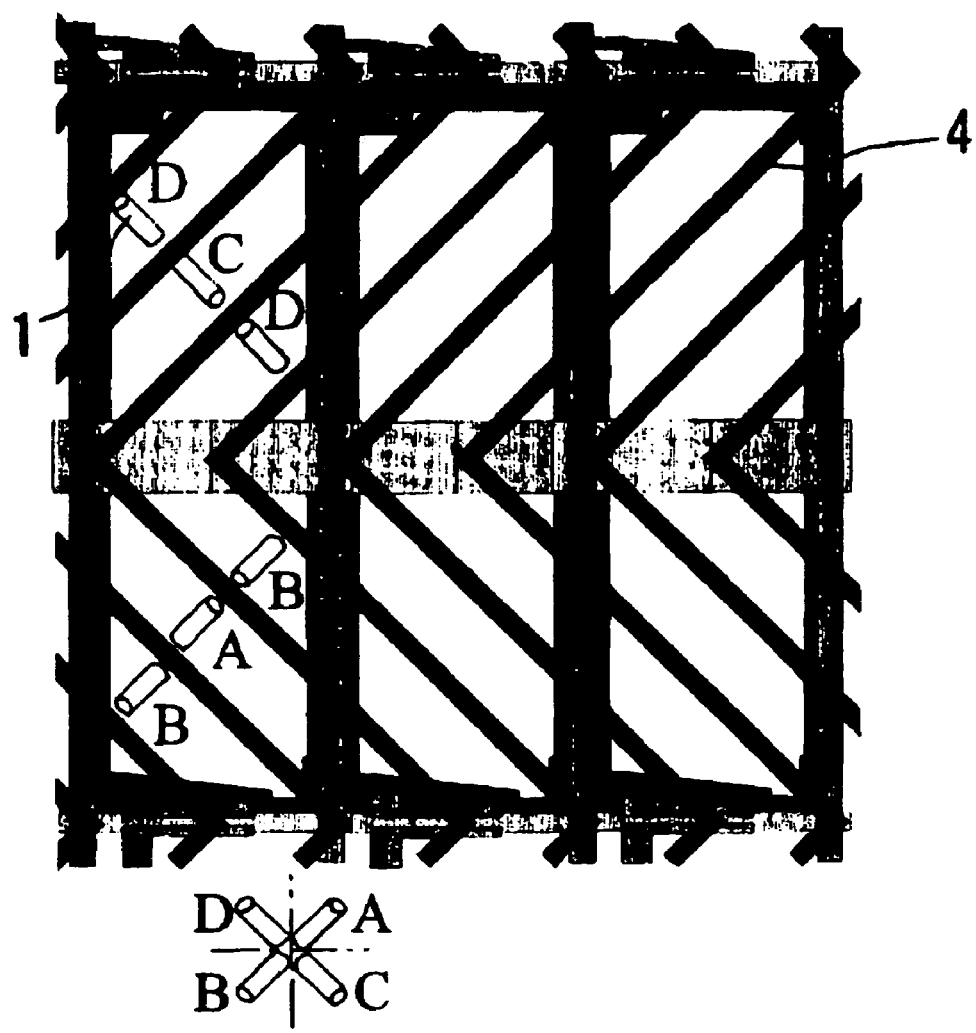
FIG. 2 is a schematic plan view of an MVA-method liquid crystal panel.

Below, embodiments of this invention are explained using figures, tables, formulae, and examples. These figures, tables, formulae and examples as well as the explanation, illustrate the invention, but do not limit the scope of the invention. It goes without saying that other embodiments may also fall within the scope of this invention, insofar as there is agreement with the gist of the invention. In the figures, the same symbols are used to denote the same functions.

In a method for manufacture of a liquid crystal display device of this invention, a liquid crystal composition, comprising liquid crystal molecules and a polymerizable compound which undergoes polymerization under the action of light or a combination of light and heat and which can align the liquid crystal molecules in the vertical direction, is placed between two substrates, after which ultraviolet irradiation is used to polymerize and cure the polymerizable compound, to form at the substrate interface, separately from the liquid crystals, an ultraviolet-cured material capable of alignment control. The desired aligned state is obtained for the first time after ultraviolet irradiation (after reaction), which is completely different from the simple addition to the liquid crystals of a material which easily undergoes physical adsorption and which controls alignment. Hence prior to bonding the substrates, there is no need for processes to treat the interface, enhance the polarity, or similar. On the contrary, it is better to avid such a treatment because the uniformity of the composition ratio may be impaired at the time of injection.

Heat may also be used in the polymerization. Through polymerization, a cross-linked material layer (cured-material layer) from a polymerizable compound which can align liquid crystal molecules in the vertical direction is formed on the surface over the substrate in contact with the liquid crystal layer (hereafter called the liquid crystal contact face). The cross-linked material layer has a cross-linked structure portion adhering to the liquid crystal contact face (adhered cross-linked structure portion) and a terminal portion which rises from the liquid crystal contact face (rising terminal portion); it is thought that the liquid crystal molecules are aligned in the vertical direction by this rising terminal portion. As the rising terminal portion, alkyl chains are often used.

As the polymerizable compound or compounds used to form the adhered cross-linked structure portion, it is necessary that a compound having two or more cross-linkable polymerizing functional groups be comprised; in order to control the extent of the cross-linking and to form the rising portion, a compound having one polymerizing functional group which does not form cross-links may be used as well. A compound having polymerizing functional groups may comprise so-called monomers and oligomers.

In this liquid crystal display device, pairs of electrodes are placed either on each or on only one of the above two substrates, and by applying a voltage across the electrodes, the liquid crystal molecules of the above liquid crystal layer are aligned. The polymerization of this invention is normally performed in a state in which no voltage is applied across the electrodes, but may comprise a state in which voltage is applied, so long as there is no contradiction with the objectives of the invention.

When an alignment control film is not used in the above, after forming the liquid crystal layer between the substrates, display irregularities, declines in contrast, and other problems often occur when the alignment of liquid crystal molecules is changed.

This is thought to occur because, when the liquid crystal alignment in the initial period of polymerization is in a random state, what are called discontinuous disclinations in the liquid crystal alignment and other alignment anomalies, which occur in the initial period of or during curing, remain.

It was discovered that such alignment anomalies can be eliminated either by some means at a stage midway in the polymerization, or by using a liquid crystal composition which does not easily give rise to such defects in the first place. Specifically, it is effective to control the polymerization rate and to employ thermal or mechanical stimuli midway through the polymerization in order to eliminate disorder which may cause alignment anomalies. That is, the above alignment anomalies occur because the elastic strain of the liquid crystal molecules is larger than in other regions, and it is thought that if some opportunity is provided, the liquid crystal molecules will be re-aligned so as to be continuous with other satisfactory regions.

One possible method for eliminating such alignment anomalies at a stage midway in the polymerization is a method for manufacture of a liquid crystal display device which combines, in order, ultraviolet irradiation under a first set of conditions, and ultraviolet irradiation under a second set of conditions, for which the polymerization rate is higher than for ultraviolet irradiation under the first set of conditions.

Figure 3A:
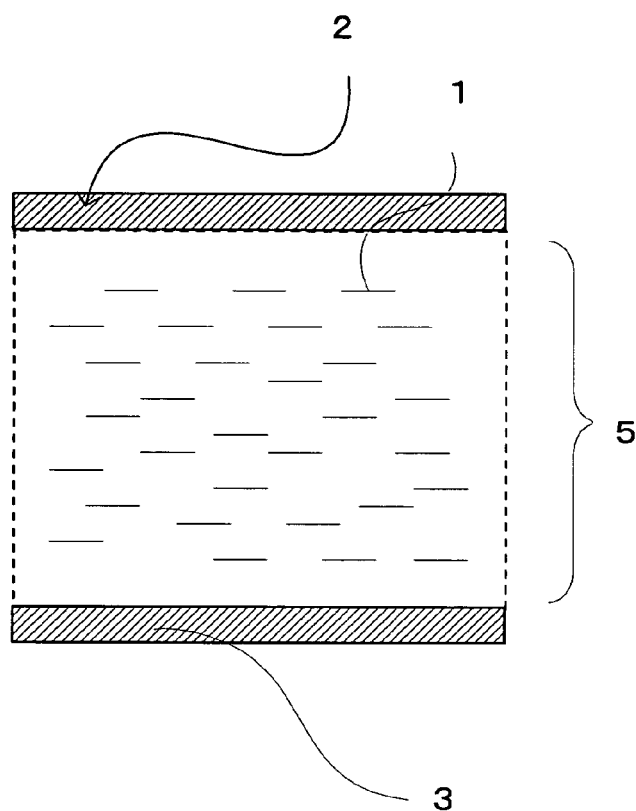
FIG. 3A is a schematic diagram illustrating a basic principle of this invention.
Figure 3B:
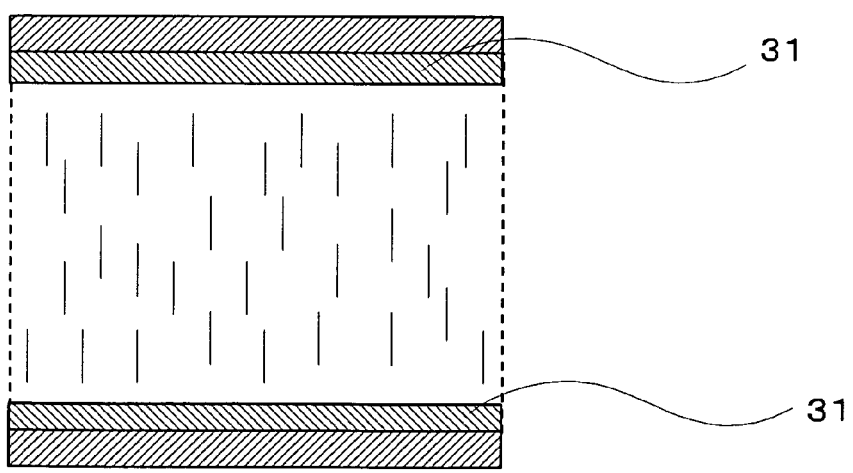
FIG. 3B is a schematic diagram illustrating a basic principle of this invention.
Figure 3C:
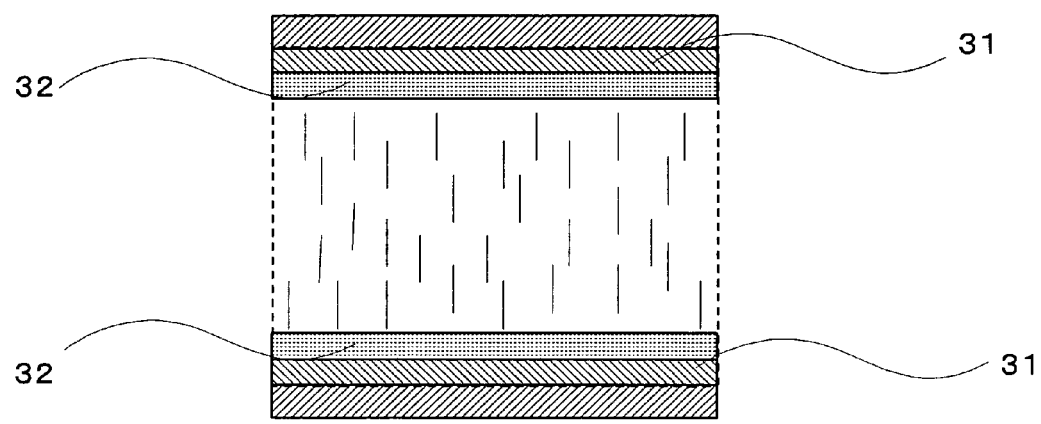
FIG. 3C is a schematic diagram illustrating a basic principle of this invention.

Basic principles of the invention are illustrated in FIG. 3A, FIG. 3B, and FIG. 3C. As the method of polymerization of the polymerizable compound, after placing the liquid crystal composition 5 into an enclosed state (FIG. 3A), ultraviolet irradiation is performed under the first set of conditions to form a first cross-linked material layer 31 of the desired thickness on the liquid crystal contact face, as shown in FIG. 3B, and then ultraviolet irradiation is performed under the second set of conditions for which the polymerization rate is higher than for ultraviolet irradiation under the first set of conditions to form a second cross-linked material layer 32 of the desired thickness on the liquid crystal contact face, as shown in FIG. 3C.

By this means, as a result of the ultraviolet irradiation under the first set of conditions the polymerization is comparatively moderate, so that the occurrence of alignment anomalies can be suppressed, and even if the polymerization rate is subsequently raised, a liquid crystal layer with no or few alignment anomalies can be obtained without problem. Hence by implementing multiple stages in the ultraviolet irradiation process, declines in productivity can be suppressed and an optimally aligned state can be obtained. In order to suppress declines in productivity, it is preferable that in the ultraviolet irradiation under the second set of conditions the fraction of the short-wavelength component near 310 nm be increased. However, because degradation of characteristics may occur due to damage to the liquid crystals themselves, the ultraviolet intensity of this short-wavelength component should be held to 1 $mW/cm^2$ or below.

The extent to which the polymerization rate for ultraviolet irradiation under the second set of conditions should be made higher than the polymerization rate for ultraviolet irradiation under the first set of conditions can be determined according to actual circumstances. For example, a rate twice as fast or higher is preferable.

The conditions determining the polymerization rate can be judged in terms of the rate at which the polymerizable compound is used in the polymerization. Hence they can be determined from the amount of the polymerizable compound remaining in the liquid crystal composition during the polymerization reaction. However, they can also be determined by measuring the thickness of the cross-linked material layer. Specifically, they can be determined in terms of the wavelength of ultraviolet rays used, or the ultraviolet intensity, or the temperature, or a combination of these. Here, "temperature" refers to the temperature of the liquid crystal composition during ultraviolet irradiation, but there is no need to directly control this temperature. The ambient temperature may be controlled instead.

The ending point of ultraviolet irradiation under the first set of conditions and the ending point of ultraviolet irradiation under the second set of conditions can be determined arbitrarily by observing the quality of the fabricated liquid crystal layer and the productivity. In the above example, the thickness of the cross-linked material layer was taken as a guideline, but judgments may also be made based on the amount of the polymerizable compound remaining in the liquid crystal composition, and once the optimal conditions have been established, a prescribed polymerization time can be used as the guideline. Another practical method is to determine the end point for the first set of conditions by observing the state of alignment of the liquid crystal molecules.

The ultraviolet irradiation under the above first set of conditions is typically performed from the start of polymerization, but this need not necessarily be the case, and may under some circumstances be performed from midway in the polymerization. Also, the ultraviolet irradiation under the second set of conditions need not necessarily be performed immediately following the ultraviolet irradiation under the above first set of conditions, and other conditions may intervene therebetween. Moreover, the first set of conditions during ultraviolet irradiation need not be constant; similarly for the second set of conditions. For example, conditions may be changed such that the polymerization rate increases gradually. In this case, it is difficult to distinguish at which point the first set of conditions ends; but the objectives of this invention do not require such a distinction. It is important that ultraviolet irradiation under the above first set of conditions and ultraviolet irradiation under the above second set of conditions be performed in this order.

The ultraviolet irradiation under the first set of conditions and the ultraviolet irradiation under the second set of conditions can both be performed a plurality of times. For example, a combination can be used in which ultraviolet irradiation is performed under the first set of conditions, then ultraviolet irradiation is performed under a second set of conditions for which the polymerization rate is higher than the ultraviolet irradiation under the first set of conditions, and then ultraviolet irradiation is performed under a third set of conditions for which the polymerization rate is higher than the ultraviolet irradiation under the second set of conditions. Also, a combination can be used in which ultraviolet irradiation is performed under the first set of conditions, then ultraviolet irradiation is performed under a third set of conditions for which the polymerization rate is lower than the ultraviolet irradiation performed under the first set of conditions, and then ultraviolet irradiation is performed under the second set of conditions for which the polymerization rate is higher than the ultraviolet irradiation under the first set of conditions. In the latter case, the initial adhered cross-linked structure portion is formed comparatively rapidly, then polymerization is induced at a more relaxed rate so as to suppress the occurrence of alignment anomalies, after which no difficulties are encountered even if the polymerization rate is increased, so that a liquid crystal layer can be obtained with no or with few alignment anomalies. By this means, the polymerization time can be shortened.

In this case, the extent to which the polymerization rate of ultraviolet irradiation under the third set of conditions should be made lower than the polymerization rate of ultraviolet irradiation under the first set of conditions, and the extent to which the polymerization rate of ultraviolet irradiation under the second set of conditions should be made higher than ultraviolet irradiation under the first set of conditions, can be determined according to actual circumstances.

As a method of eliminating alignment anomalies in a stage midway through polymerization, there is a method for manufacture of liquid crystal display devices comprising processing to activate the molecular motion of liquid crystal molecules midway through the ultraviolet irradiation. Thus heat can for example be used to facilitate re-positioning of liquid crystal molecules and so eliminate alignment anomalies. Specifically, an example involves heating the liquid crystal layer to the vicinity of the phase transition point from a liquid crystal state of the liquid crystal molecules to an isotropic state. In many cases it is advantageous to halt the ultraviolet irradiation during this period.

When the temperature is raised to the phase transition point or higher of liquid crystal molecules from the liquid crystal state to an isotropic state, the alignment itself becomes disordered, which is undesirable. While the specific temperature can be determined through experiment, often it is preferable that the temperature be in the range below the phase transition point, up to $-5°$ C. below the phase transition point. However, when the viscosity of the liquid crystal molecules is low, heating in the range up to $-10°$ C. below the phase transition point is also effective.

As a method of eliminating alignment anomalies at a stage midway in the polymerization, there is a method for manufacture of liquid crystal display devices comprising processing to deform the liquid crystal layer midway through the ultraviolet irradiation. Specifically, it is effective to apply an external force to the liquid crystal panel, bending the substrates.

Figure 4A:
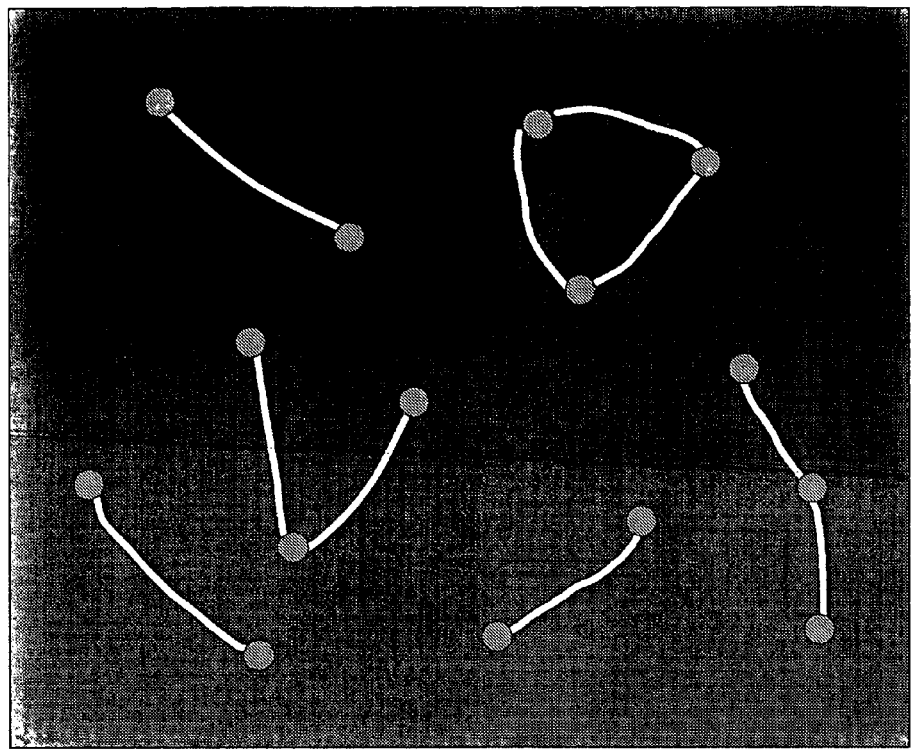
FIG. 4A is a drawing showing disclinations in a black display screen.

The above alignment anomalies nearly all occur with the spacers existing between the substrates as nuclei. This is shown schematically in FIG. 4A. FIG. 4A shows the manner of occurrence of alignment anomalies (disclinations) appearing as white lines between the spacers shown as circles on a black display in a display screen.

Figure 4B:
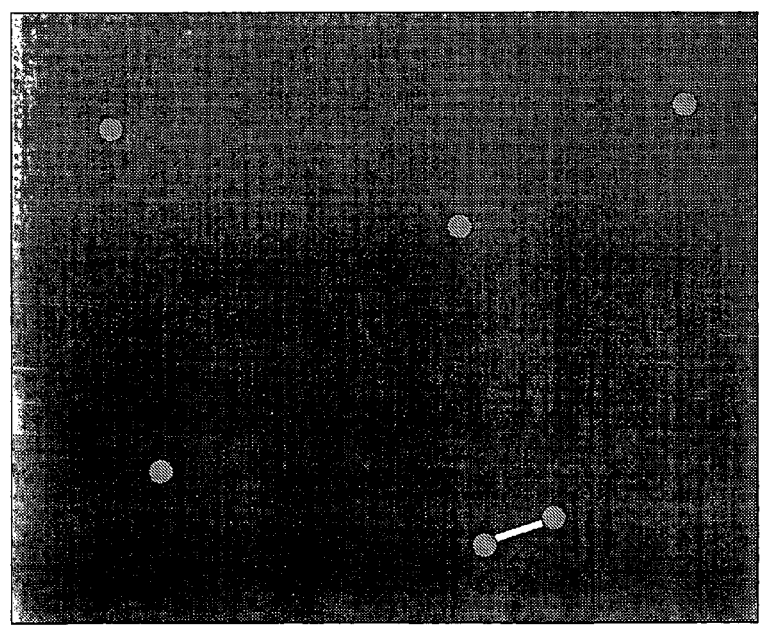
FIG. 4B is another drawing showing disclinations in a black display screen.

Upon studying the occurrence of these alignment anomalies, it was found that anomalies which connect spacers over shorter distances are in more stable states, and are not easily annihilated. For example, FIG. 4B shows the alignment state of a panel fabricated with a lower density of spacer dispersion than in the panel of FIG. 4A. From the figure it is easily seen that white lines which occur connecting spacers over shorter distances tend to remain.

Hence controlling the distances between spacers to above a certain prescribed value is also effective for suppressing the occurrence of alignment anomalies from the structural viewpoint. The prescribed distance is affected by the liquid crystal composition adopted and other conditions of manufacture of the liquid crystal panel, and so cannot be determined uniquely, but can be decided experimentally through observation of the occurrence of alignment anomalies, as in FIG. 4A and FIG. 4B.

Figure 7:
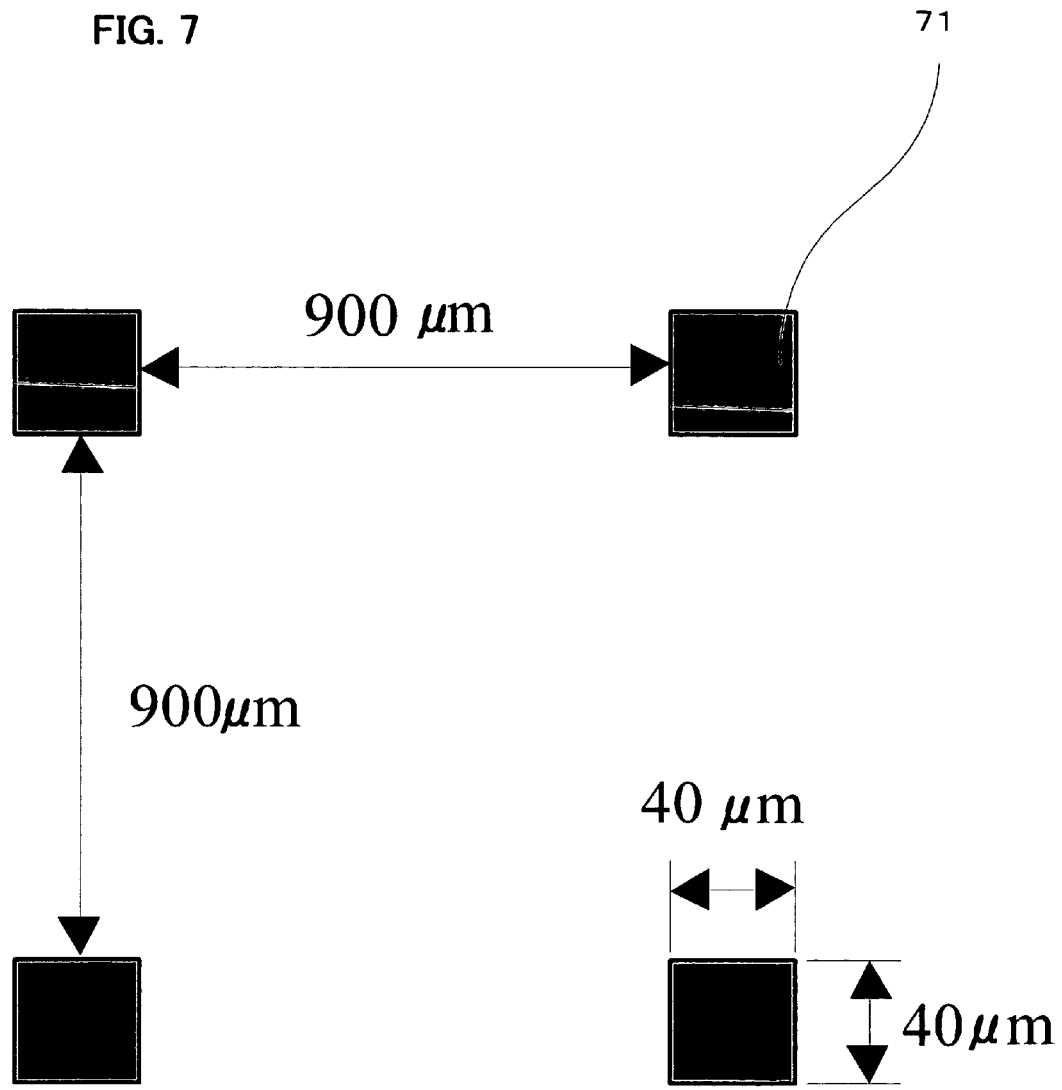
FIG. 7 is a schematic diagram showing the manner in which columnar protrusions are provided at constant intervals on a substrate.

As the specific means for controlling the distances between spacers, it is preferable that protruding structures provided on a substrate be used, rather than dispersion of beads. For example, a method is conceivable in which columnar protrusions 71 at constant intervals as shown in FIG. 7 are provided on one of the substrates, for example using a printing technique.

In the above, methods for elimination of alignment anomalies at a stage midway in the polymerization by some means have been explained; but the problem can also be resolved through the selection of an appropriate polymerizable compound.

Figure 5A:
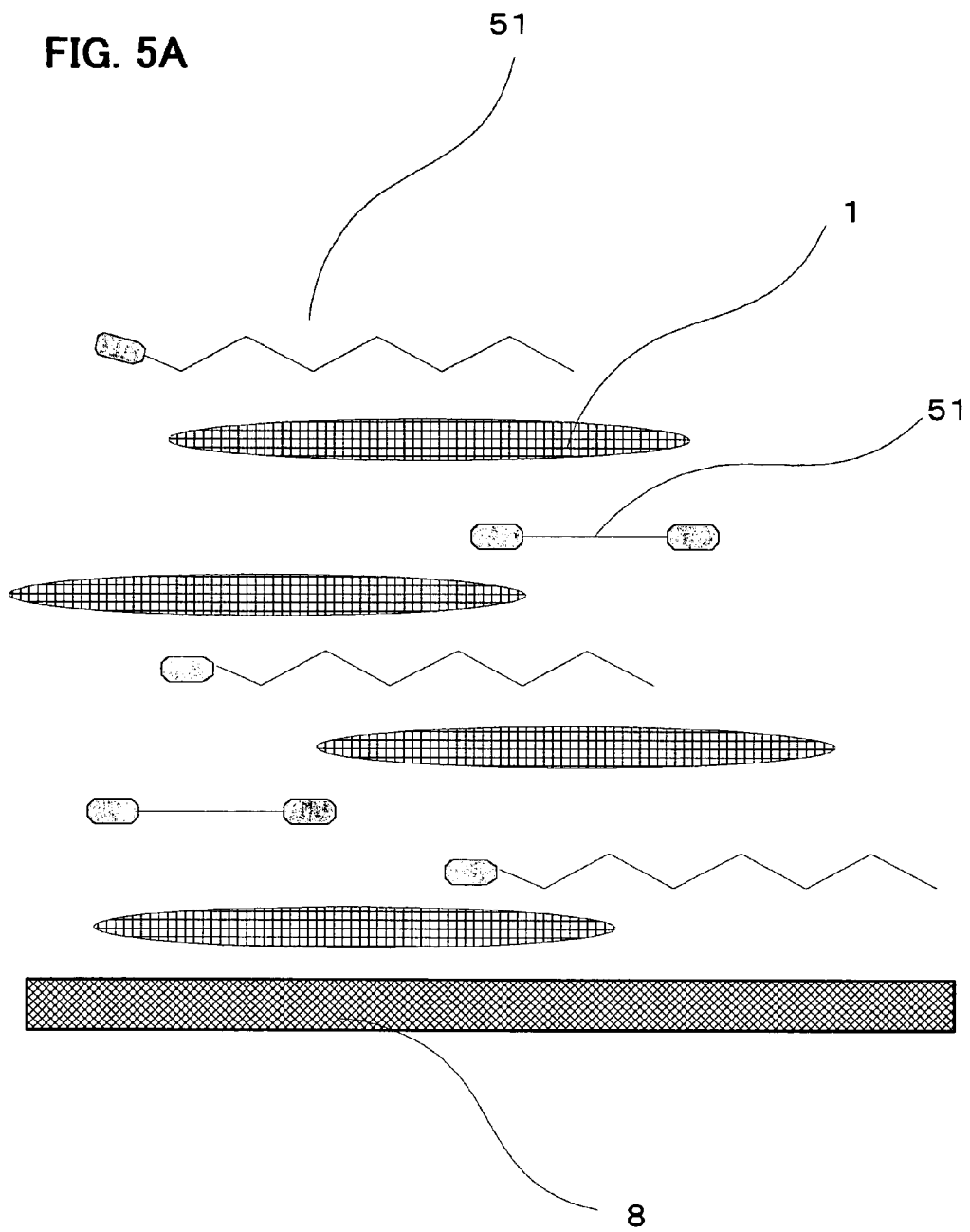
FIG. 5A is a schematic cross-sectional view showing the manner of formation of a cross-linked material layer in a liquid crystal contact face by polymerization of a polymerizable compound of this invention.
Figure 5B:
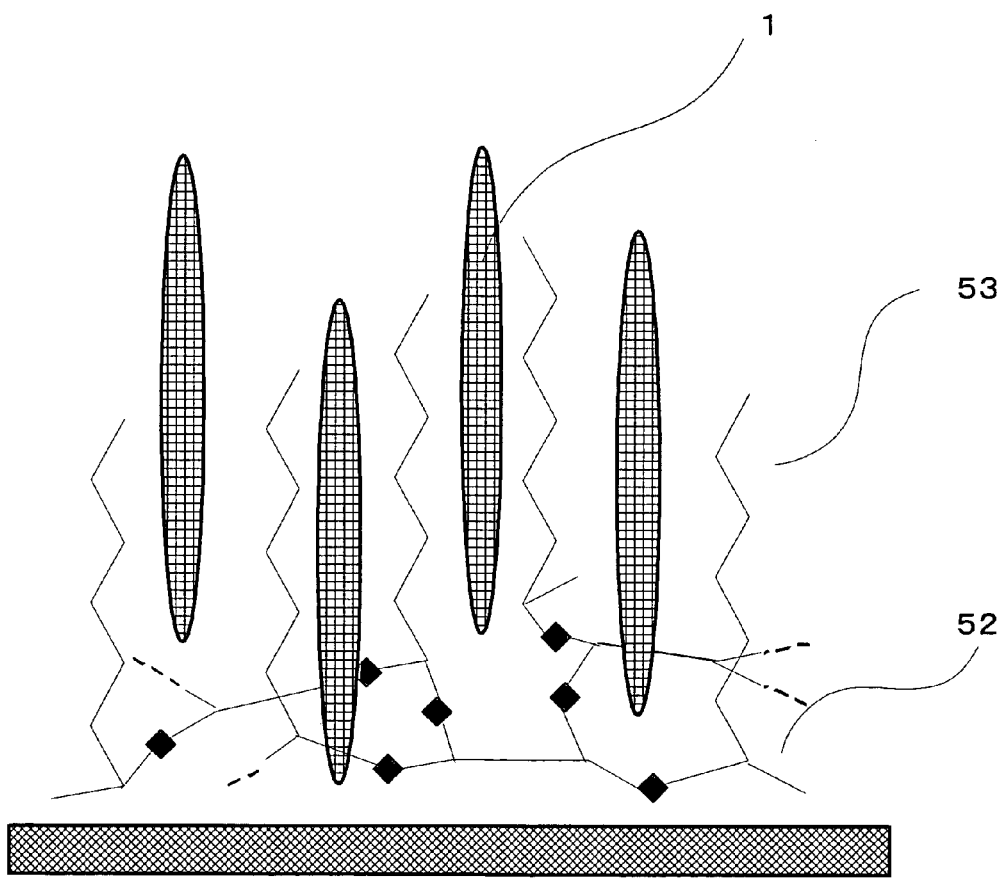
FIG. 5B is a schematic cross-sectional view showing the manner of formation of a cross-linked material layer in a liquid crystal contact face by polymerization of a polymerizable compound of this invention.

FIG. 5A and FIG. 5B show the manner in which a polymerizable compound of this invention is polymerized to form a cross-linked material layer at the liquid crystal contact face. First, immediately after injection of an uncured liquid crystal composition comprising liquid crystal molecules and a resin composition, the polymerizable compound 51 and liquid crystal molecules 1 are aligned parallel to the liquid crystal contact face 8, as shown in FIG. 5A. Nothing is formed at the surface of the liquid crystal contact face 8.

In this invention, "liquid crystal contact face" does not necessarily refer to a substrate surface, but may denote the surface of a layer actually in contact with the liquid crystal layer. For example, a substrate and the liquid crystal layer may be stacked with a filter layer intervening; when the liquid crystal layer is actually in contact with the filter surface rather than the surface of the substrate, the liquid crystal contact face is the filter surface which is in contact with the liquid crystal molecules. When the filter surface has for example been subjected to hydrophilic treatment, the term refers to the treated surface.

In this state, by for example irradiating with ultraviolet rays, the structure is realized in which adhered cross-linked structure portion 52 shown in FIG. 5B is formed in a film shape, from which rising terminal portions 53 are rising.

Figure 13:
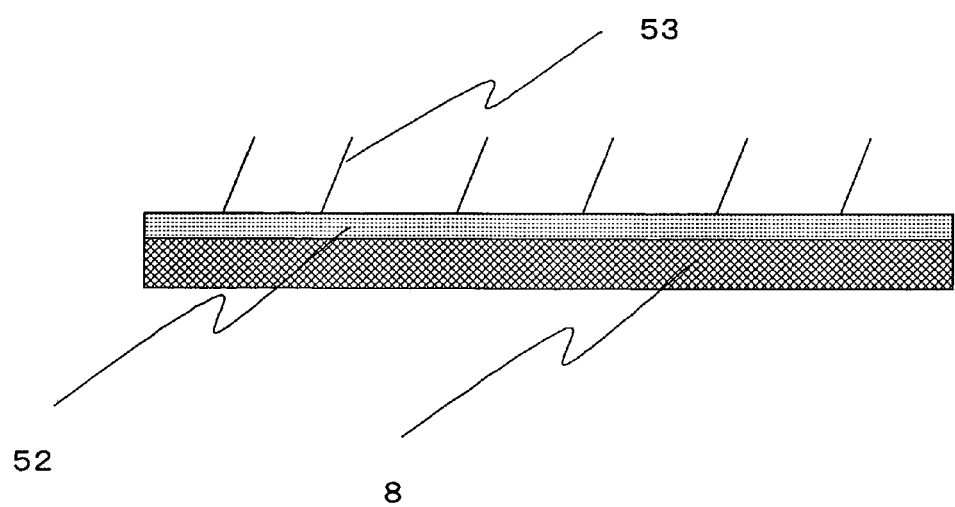
FIG. 13 is a (partial) schematic cross-sectional view of a liquid crystal panel; and, FIG. 14 is a (partial) schematic plan view of a liquid crystal panel.
Figure 14:
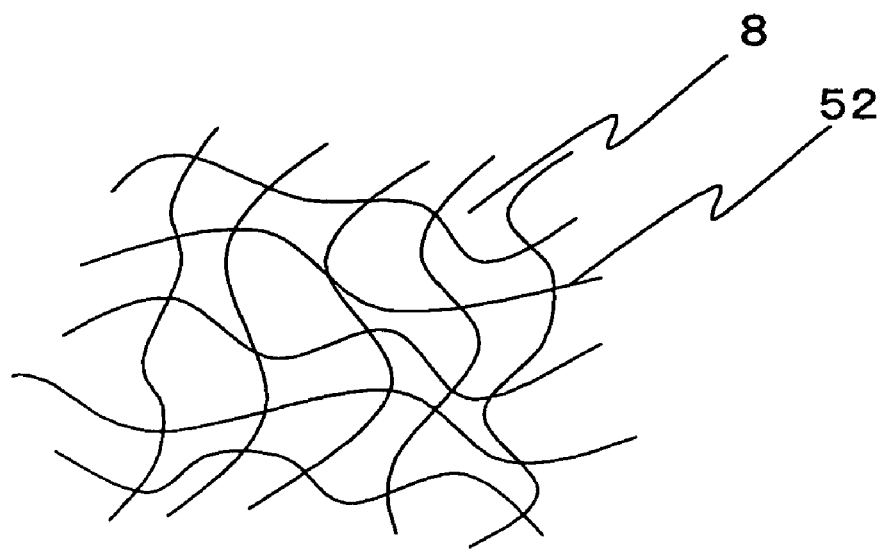

This can be shown schematically in a different manner as in FIG. 13 and FIG. 14. FIG. 13 is a cross-sectional view of the liquid crystal contact face seen from the side; FIG. 14 is a plan view seen from above. In FIG. 13, the manner in which the adhered cross-linked structure portion 52 adheres to the liquid crystal contact face 8 and in which the rising terminal portions 53 are rising is seen; in FIG. 14, the manner in which the adhered cross-linked structure portion 52 is entangled to form a mesh-like structure and adheres to the liquid crystal contact face 8 is seen.

Actual adhesion of the adhered cross-linked structure portion 52 to the liquid crystal layer contact face can easily be confirmed by removing the liquid crystal layer contact face, performing washing and similar, and then analyzing the surface. Actual rising of the rising terminal portions 53 can easily be confirmed by the fact that liquid crystal molecules 1 are aligned vertically. In this way, it is possible to align liquid crystal molecules 1 vertically when no voltage is applied.

The alignment in this configuration is different from what is called a polymer-dispersed liquid crystal (PDLC) of the prior art. Rather than forming, across the entire liquid crystal layer, polymers which enable the alignment of liquid crystal molecules, it can be considered that alignment is controlled through the combined action of the thin film-shape adhered cross-linked structure portion 52 formed on the liquid crystal layer contact face and the rising terminal portions 53. Thin film-shape adhered cross-linked structure portions 52 normally occur on both the liquid crystal layer contact faces.

In such a structure, satisfactory alignment of liquid crystal molecules is achieved through the high ability of the rising terminal portions 53 to control the alignment of liquid crystal molecules, and through the strong formation of a layer of the adhered cross-linked structure portion 52 on the liquid crystal layer contact face. The latter is more advantageous when the proportion of a compound with two or more polymerizing functional groups in the polymerizable compounds is higher.

However, if only an ordinary alkyl chain as described above is used for the rising terminal portions 53, the ability to align liquid crystal molecules vertically (vertical alignment governing ability) is not so great, and consequently the need arises to increase the proportion in the polymerizable compounds of a compound having a single polymerizing functional group. When this measure is taken, the proportion of a compound having two or more polymerizing functional groups to form the adhered cross-linked structure portion 52 is lowered, and the ability of the adhered cross-linked structure portion 52 to strongly form a layer on the liquid crystal layer contact surface is diminished. Further, the fraction of unreacted material remaining in the liquid crystal layer is increased, and the voltage retention rate and other electrical properties are diminished.

Conversely, from the perspective of increasing the proportion of a compound having two or more polymerizing functional groups in the polymerizable compounds, a layer of the more strongly adhered cross-linked structure portion can be formed on the liquid crystal contact face, and the fraction of unreacted material remaining in the liquid crystal layer is decreased, so that the electrical retention and other electrical characteristics are improved. However, if the proportion of a compound having two or more polymerizing functional groups is increased beyond a certain level, in the case of conventional alkyl chains, the vertical alignment governing ability becomes completely inadequate. Due to such circumstances, there are problems which cannot easily be surmounted when a conventional alkyl chain alone is used. Almost no differences in alignment are seen even if alkyl groups are varied from $C_{12}$ (lauryl) to $C_{18}$ (stearyl). This is thought to be because simple alkyls and similar have high flexibility, so that even when the chain length is made longer there is little contribution to the vertical alignment properties.

As a result of studies, it was discovered that if ring structures are introduced in between straight alkyl chains for a compounds having a single polymerizing functional group for forming the rising terminal portions 53, the vertical alignment governing ability can be improved.

More specifically, it is preferable that a compound be used having the structure of the following formula (1).

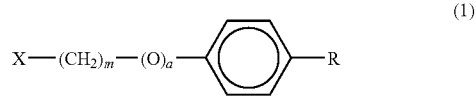

(1)

(Here X is an acrylate group or a methacrylate group; R is an alkyl group or an alkoxy group, with the number of carbon atoms between 1 and 18, or one of these groups with a portion of the carbon atoms or hydrogen atoms replaced by other atoms or molecules; a is 0 or 1; and m is an integer between 0 and 2.)

At this time, it is preferable that a=0, in order to lower the molecular weight; and by setting m=0, the reactive group X and the benzene ring are brought into proximity. If a=0 and m=0, a structure can be adopted in which the reactive group X and benzene ring are directly bonded.

This structure in which a benzene ring and reactive group X are directly bonded is the most preferable with respect to reactivity induced by light, but a balance must be considered between miscibility with the liquid crystal molecules, and volatility of the polymerizable compound. The above structure provided with a benzene ring is also advantageous in that the volatility of the polymerizable compound is small compared with structures without a benzene ring, so that there is no contamination of the interior of the vacuum chamber of the injection equipment, and in other respects also process management is facilitated. That is, it is possible to obtain materials which strike a balance between vertical alignment governing ability, miscibility, and volatility.

In order to suppress changes in voltage retention and changes in residual DC with time, etc., so as to maintain reliability as a liquid crystal display device, it is essential that impurity ions within the liquid crystal composition not be released; to this end, it is effective that the liquid crystal composition comprise a compound having at least one ring structure, and with two or more function groups having an acrylate or methacrylate group at the end. In this case, a resin film with few residual monomers can be formed without further addition of a polymerization initiator.

As the result of studies it was found that, among these, compounds are preferable which have the structure of the following formula (2).

(2)

(Here, Y is an acrylate group or a methacrylate group, A is an aromatic ring which may have a substituent, an alicyclic ring which may have a substituent, or a group of an aliphatic chain which may have branches, and n is an integer of 0 or 1.) In this formula, the two n's need not have the same value.

Here, from the standpoint of reactivity, it is preferable that another bond not exist (n=0) between the ring structure and the acrylate group or the methacrylate group. Or, if such a bond exists, it is preferable that there be a single (n=1) methylene group (—$CH_2$—).

Through the various embodiments of this invention described above and combinations thereof, a process to form an alignment control film becomes unnecessary. Hence numerous advantages are obtained, such as enhanced quality of the liquid crystal panel, improved yields, simplification of production facilities, process simplification, and reduced costs. Moreover, the desired alignment can easily be obtained even for thin, flexible film-shape substrates and for liquid crystal panels in shapes which are flexed or other than flat. And, ultra-large size motherglass for the substrates of liquid crystal panels can easily be accommodated.

A liquid crystal display device manufactured using the above manufacturing methods has improved quality and high reliability. There is also greater freedom in design, including liquid crystal panels employing thin, flexible film-shape substrates and with shapes that are not flat, but flexed, as well as ultra-large size panels.

As the liquid crystals which can be used in this invention, any well-known liquid crystals can be used so long as there is no contradiction with the objectives of this invention. Depending on the driving method, not only liquid crystals with a negative dielectric constant anisotropy, but liquid crystals having a positive dielectric constant anisotropy can of course be used; but it is preferable that the liquid crystals have a negative dielectric constant anisotropy and have the properties of being aligned substantially vertically when no voltage is applied, and of being inclined, when a voltage is applied, with the direction regulated by protrusions formed on the substrates or by voids (slits) in the electrodes.

Also, in addition to the polymerizable compounds of the above formulae (1) and (2), any well-known polymerizable compound can be used, so long as there is no contradiction with the objectives of this invention. In general, polymerizable compounds can be selected from among what are called monomers and oligomers. Examples include compounds having a polymerizing functional group such as an acrylate group, a methacrylate group, an epoxy groups, a vinyl groups, and an aryl groups. Acrylates and methacrylates are typical of them.

Polymerizable compounds may comprise a single component or a plurality of components. In general, as described above, polymerizable compounds comprising a cross-linking component are preferable. Examples of cross-linking components include those having, in a single molecule, a plurality of polymerizing double-bonds such as acrylate groups, methacrylate groups, epoxy groups, vinyl groups, and aryl groups, and having a structure polymerizable with other molecules under the action of ultraviolet irradiation or other light and heat.

EXAMPLES

Next, examples of this invention and comparative examples are explained in detail; but this invention is not limited to these examples. Observations of alignment states were performed using an optical microscope. The amount of alignment anomalies was determined by visual observation of the state (principally of the number) of alignment anomalies (appearing as white lines) in a black display screen, as shown in FIG. 4A and FIG. 4B. The contrast ratio was determined using evaluation cells adopting the MVA structure, dividing the transmittance when 5 V was applied by the transmittance when no voltage was applied. In the examples, ultraviolet radiation in the wavelength range from 310 to 365 nm was used.

Example 1

Figure 6:
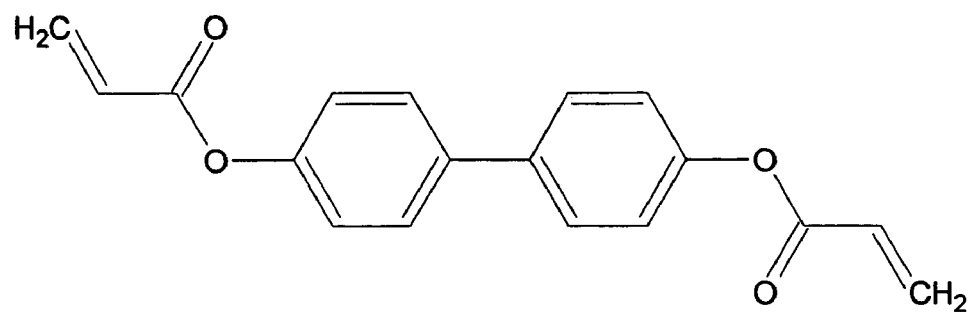
FIG. 6 shows the chemical structures of examples of polymerizable compounds (a, b) of this invention.
Figure 6:
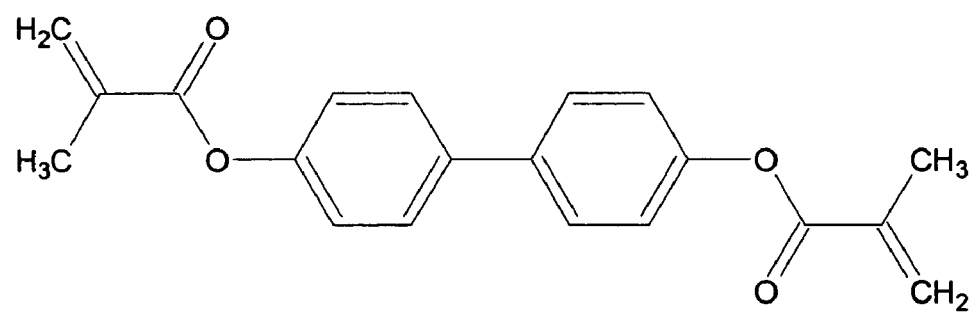

$1.3 \times 10^{-4}$ mol/g lauryl acrylate was dissolved in liquid crystals A, produced by Merck and having a negative dielectric constant anisotropy; then, a monomer having two functional groups of this invention, having a ring structure as shown in (a) of FIG. 6 was dissolved in the amount of $1.3 \times 10^{-5}$ mol/g, equivalent to one tenth of the above amount; this liquid crystal composition was injected into an evaluation cell and the cell was sealed. The liquid crystals A had the properties of being substantially vertically aligned when no voltage is applied, and being inclined with a voltage applied, in directions regulated by protrusions formed on the substrates or by slits in the electrodes.

The evaluation cell with an MVA structure was fabricated using two glass substrates on which were formed electrodes of ITO (indium tin oxide), bonded together such that the cell thickness was 4.25 μm. No alignment control film was formed on the substrates.

(a) Alignment states were observed in cells with the above structure, irradiated with unpolarized ultraviolet light at 1 mW/cm² for 9000 mJ/cm² and at 10 mW/cm² for 9000 mJ/cm². As a result, vertical alignment was obtained in both evaluation cells, but there were fewer regions of alignment anomalies (portions not aligned vertically, visible as white lines) in the former than in the latter, and contrast was higher. In comparisons of the alignment states resulting from heating to the isotropic phase followed by gradual cooling, again there remained numerous anomalous alignment regions in the latter cell.

(b) Alignment states were observed in a cell with the above structure, after irradiation with unpolarized ultraviolet light at 1 mW/cm$^2$ for 1500 mJ/cm$^2$ (equivalent to the ultraviolet irradiation of the above first condition), and substantially vertical alignment was already present. Thereafter, the ultraviolet intensity was adjusted to 10 mW/cm$^2$ and irradiation for 7500 mJ/cm$^2$ performed (equivalent to the ultraviolet irradiation of the above second condition), for a total of 9000 mJ/cm$^2$. As a result, regions of alignment anomalies (portions not aligned vertically) were as scarce as in the case of irradiation at 1 mW/cm$^2$ for 9000 mJ/cm$^2$, and stable alignment with high contrast was obtained, while the time required was greatly reduced to ⅕ of that required previously (from two and one-half hours to approximately 32 minutes).

However, alignment anomalies visible as white lines still appeared under all of the above conditions to some extent.

Similar results were also obtained when, in place of the monomer having two polymerizing functional groups of (a) in FIG. 6, the monomer having two polymerizing functional groups shown in (b) of FIG. 6 was used.

Example 2

In (b) of Example 1, after irradiation at 1 mW/cm$^2$ for 1500 mJ/cm$^2$ (first process, equivalent to ultraviolet irradiation under the above first condition), the evaluation cell was heated to approximately 2° C. below the phase transition point for transitions from a liquid crystal state of the liquid crystal molecules to an isotropic state (N-I point). As a result, the white lines of alignment anomalies which had occurred up till then were nearly all eliminated. After this process, additional ultraviolet irradiation at 10 mW/cm$^2$ for 7500 mJ/cm$^2$ was performed (second process, equivalent to ultraviolet irradiation under the above second condition), and the aligned state was observed again. As a result, the small number of white lines that had remained before the additional irradiation vanished, and except for near the seal, substantially perfect vertical alignment was attained. Similarly to Example 1, white lines remained until the end near the seal, at which there is a particularly marked tendency for white lines to remain. The reason for the tendency of white lines to remain near the seal is thought to be the leakage of ions and similar from the sealant.

Table 1 summarizes the characteristics of the properties of the evaluation cells in Example 1 and Example 2, and the time required for polymer formation. By applying the heating process described in Example 2, considerable improvement of properties and shortening of the required time were both achieved.

TABLE 1

| | Polymer film formation method, alignment state, and required time | | |
| --- | --- | --- | --- |
| | Example 1, 1 mW/cm$^2$ | Example 1, 10 mW/cm$^2$ | Example 2 (cell center portion) |
| Alignment anomalies (white lines) | Few | Numerous | None |
| Contrast ratio (5 V/0 V) | 280 | 120 | 470 |

TABLE 1-continued

| | Polymer film formation method, alignment state, and required time | | |
| --- | --- | --- | --- |
| | Example 1, 1 mW/cm$^2$ | Example 1, 10 mW/cm$^2$ | Example 2 (cell center portion) |
| Required time (minutes) | 150 | 15 | 35 |

Example 3

After the irradiation at 1 mW/cm$^2$ for 1500 mJ/cm$^2$ in (b) of Example 1 (first process, equivalent to ultraviolet irradiation under the above first condition), instead of the heating performed in Example 2, the panel was passed through a laminator device for affixing a polarizing sheet, and pressure was applied. As a result, substantially the same effect as in the heating process performed in Example 2 was obtained. The results after an additional irradiation at an ultraviolet intensity of 10 mW/cm$^2$ for 7500 mJ/cm$^2$ (second process, equivalent to ultraviolet irradiation under the above second condition) were also substantially the same.

Example 4

As shown in FIG. 7, LC-200 resist produced by Shipley was used to form protrusions of height approximately 2 µm on both substrates, and the substrates were bonded such that the protrusions facing each other, to fabricate an evaluation cell with a cell thickness of approximately 4 µm. A liquid crystal composition similar to that of Example 1 was then injected into the evaluation cell, which was then sealed.

Next, after irradiation with unpolarized ultraviolet rays at 1 mW/cm$^2$ for 1500 mJ/cm$^2$, the ultraviolet intensity was changed to 10 mW/cm$^2$ and irradiation performed for 7500 mJ/cm$^2$, that is, for a total of 9000 mJ/cm$^2$. Evaluation of the amount of alignment anomalies revealed satisfactory alignment with no white lines.

Example 5

Figure 8:
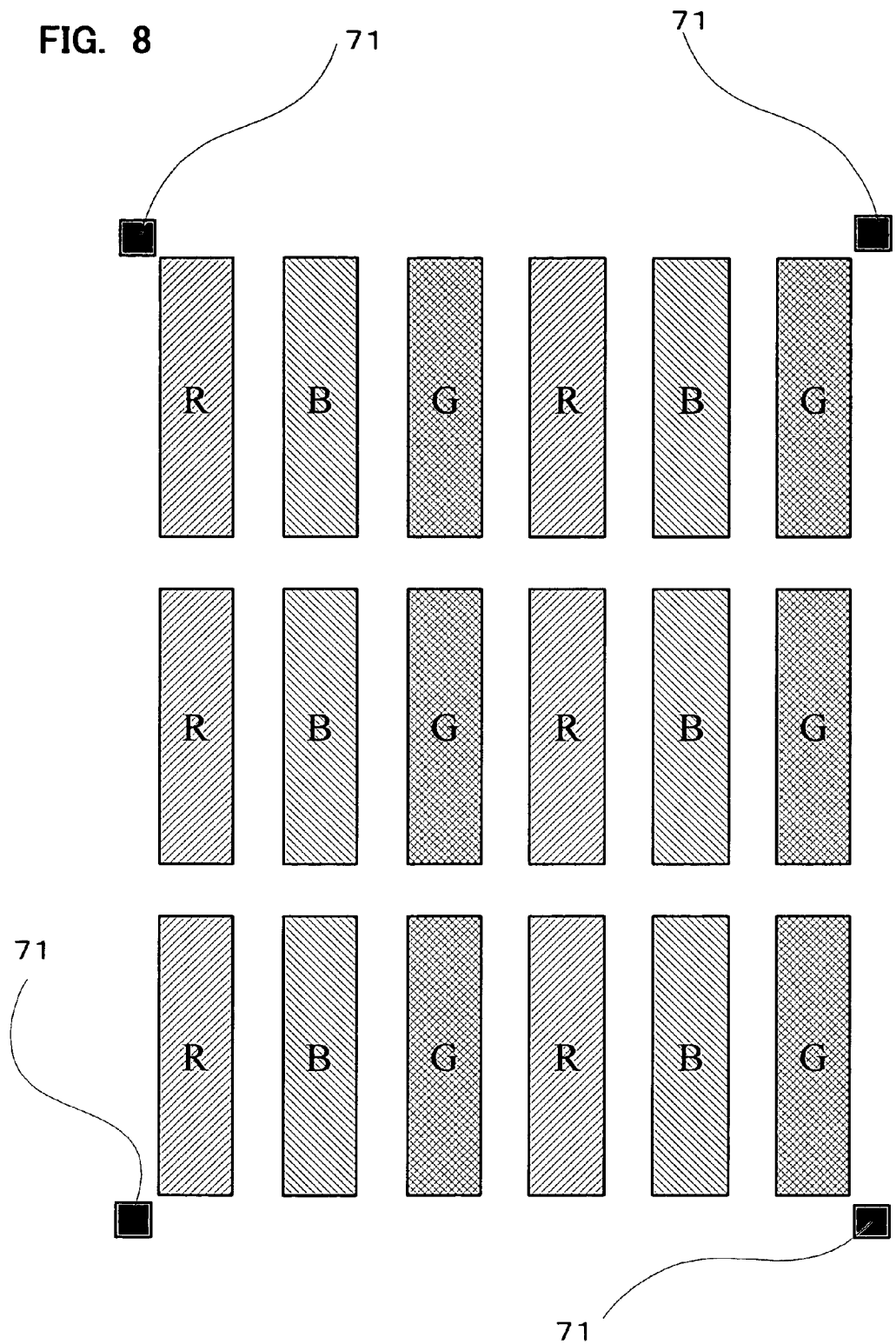
FIG. 8 is a schematic diagram showing the placement of columnar protrusions as spacers.

A panel with columnar spacers formed as 4 µm protrusions on the CF side, placed as shown in FIG. 8, and a panel in which bead spacers of average diameter 4 µm were dispersed as in the prior art, were trial-fabricated, and alignment states were evaluated. In FIG. 8, R, G and B respectively indicated red, green, and blue color pixels. In trial fabrication, 17-inch wide (1280×768 dots) MVA-mode TFT panels were fabricated; the liquid crystals and liquid crystal composition were similar to those of Example 1.

Figure 9A:
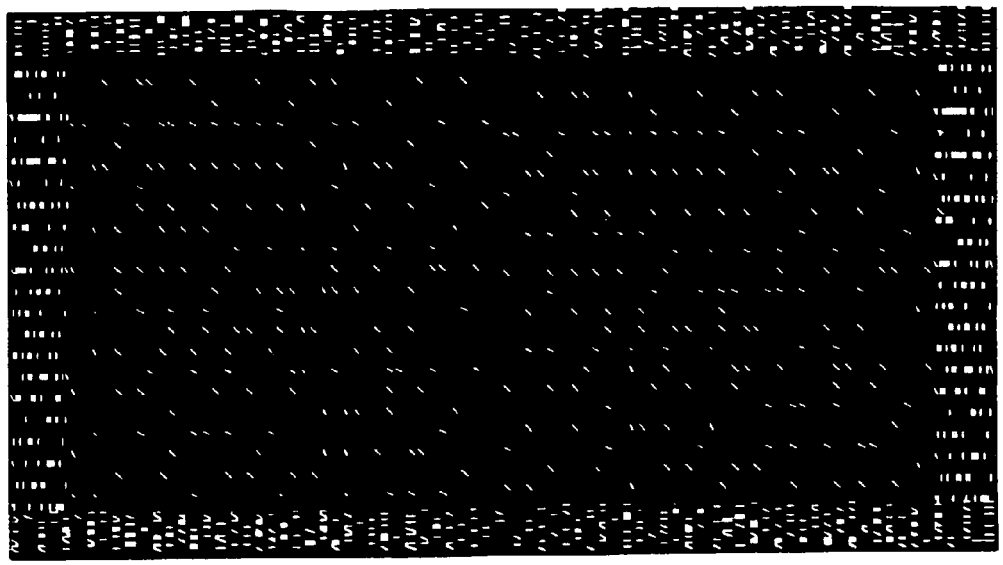
FIG. 9A is a drawing showing an alignment anomaly in a display screen.

(a) Upon irradiation with unpolarized ultraviolet rays at 1 mW/cm$^2$ for 9000 mJ/cm$^2$, while both panels exhibited vertical alignment, evaluations of the amount of alignment anomalies indicated the occurrence of numerous white lines. However, whereas in the former case white lines occurred only along the slits of the MVA structure, in the latter case white lines connecting spacers as shown in FIG. 4A also appeared, so that overall the darkened state took on a whitish appearance, as shown in FIG. 9A.

Figure 9B:
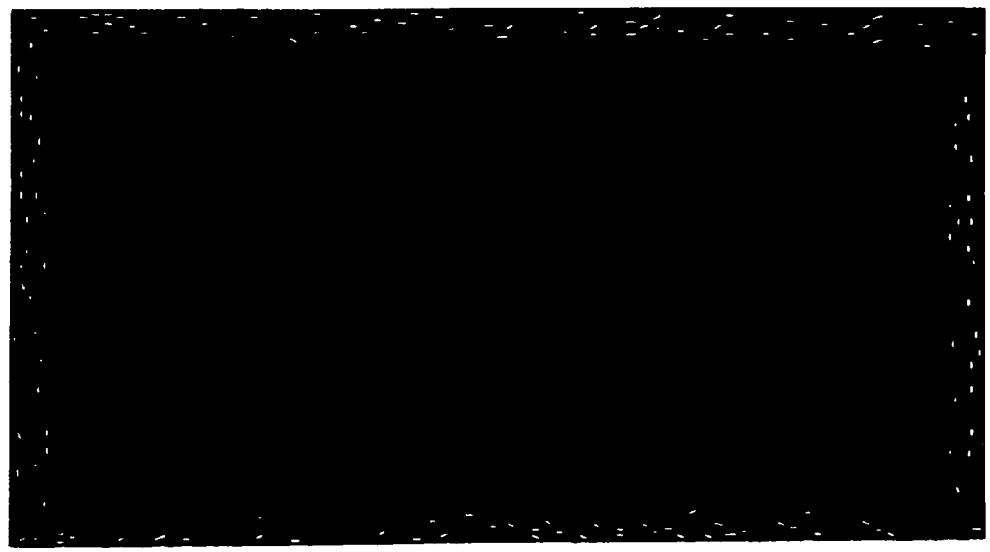
FIG. 9B is another drawing showing an alignment anomaly in a display screen.

(b) After irradiation with unpolarized ultraviolet rays at 1 mW/cm$^2$ for 1500 mJ/cm$^2$, a laminator was used to apply pressure to the liquid crystal panel, followed by irradiation at 10 mW/cm$^2$ for 7500 mJ/cm$^2$, that is, for a total of 9000 mJ/cm². As a result, in evaluations of the amount of alignment anomalies, the former panel with the columnar spacers, while having a small number of white lines remaining near the seal as in FIG. 9B, was almost entirely free of white lines. However, in the latter panel with bead spacers, white lines existed throughout the panel.

Example 6

Figure 10:
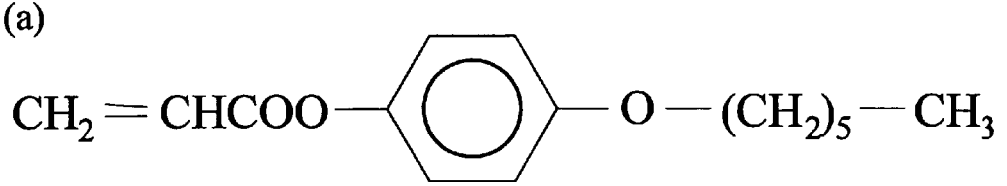
FIG. 10 shows the chemical structures of examples of polymerizable compounds (a, b, c, d) of this invention.
Figure 10:
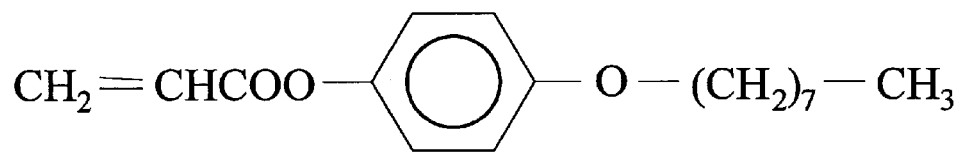
Figure 10:
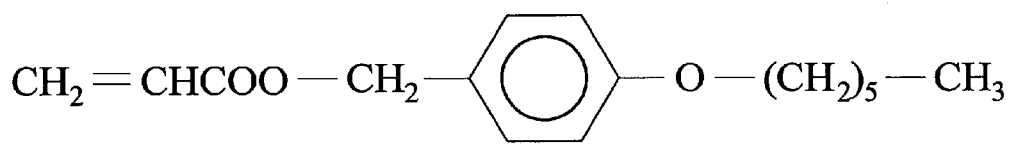
Figure 10:
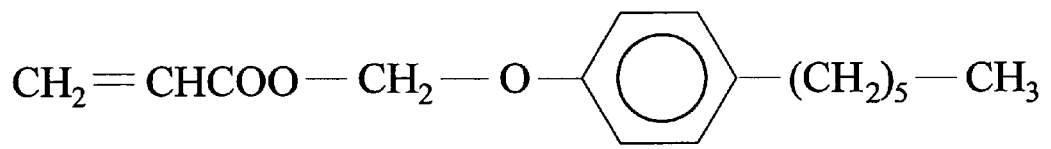

Instead of lauryl acrylate, $1.3 \times 10^{-4}$ mol/g of a monomer having one polymerizing functional group, a compound having the structure of formula (1) of this invention as shown in (a) of FIG. 10, was dissolved in the liquid crystals A produced by Merck and having a negative dielectric constant anisotropy; then, $1.3 \times 10^{-5}$ mol/g, equivalent to one tenth of the above amount, of a monomer having two polymerizing functional groups, and having the ring structure shown in (a) of FIG. 6 was dissolved, and this liquid crystal composition was used to fabricate a 17-inch wide (1280×768 dots) MVA-mode TFT panel, similarly to Example 5.

After irradiation with unpolarized ultraviolet rays at 1 mW/cm² for 1500 mJ/cm², the irradiation condition was switched to 10 mW/cm² and irradiation performed for 7500 mJ/cm², that is, for a total of 9000 mJ/cm². As a result, upon evaluating the amount of alignment anomalies, an alignment state even more satisfactory than in FIG. 9B was obtained, without applying pressure to the liquid crystal panel using a laminator.

When, instead of the monomer having one polymerizing functional group shown in (a) of FIG. 10, the monomers having one polymerizing functional groups shown in (b) through (d) of FIG. 10 were used, similar results were obtained.

Next, 0.6 mg each of liquid crystal compositions in which lauryl acrylate and the acrylate monomers of (a), (b) and (c) in FIG. 10 were each dissolved in an amount of $1.3 \times 10^{-4}$ mol/g were collected in jars, and the fraction of monomers remaining (weight percent) after evacuation for five hours was measured using gas chromatography. The results appear in Table 2. Even when there was almost no change in the molecular weight, dramatic improvement of the volatility was confirmed.

TABLE 2

Volatility of monofunctional monomers of this invention

| | Monomer | | | |
|---|---|---|---|---|
| | Lauryl acrylate | Monomer (a) | Monomer (b) | Monomer (c) |
| Fraction remaining (%) | 29 | 68 | 97 | 94 |

Example 7

Figure 11:
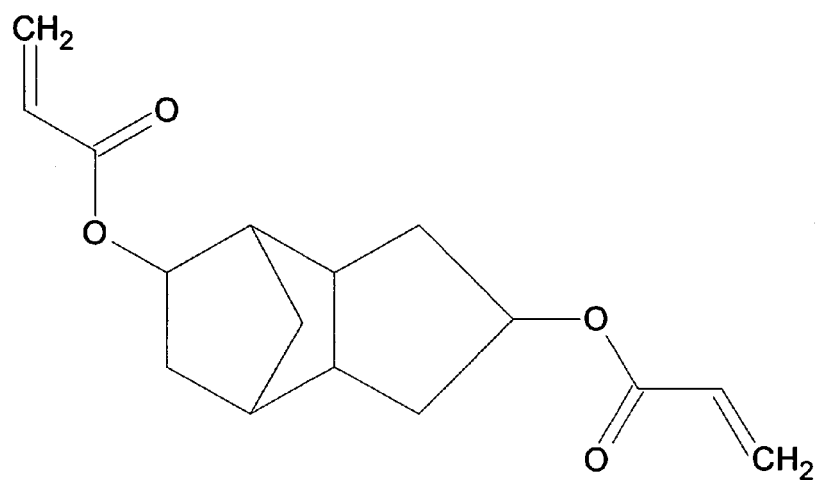
FIG. 11 shows the chemical structures of examples of polymerizable compounds (a, b) of this invention.
Figure 11:
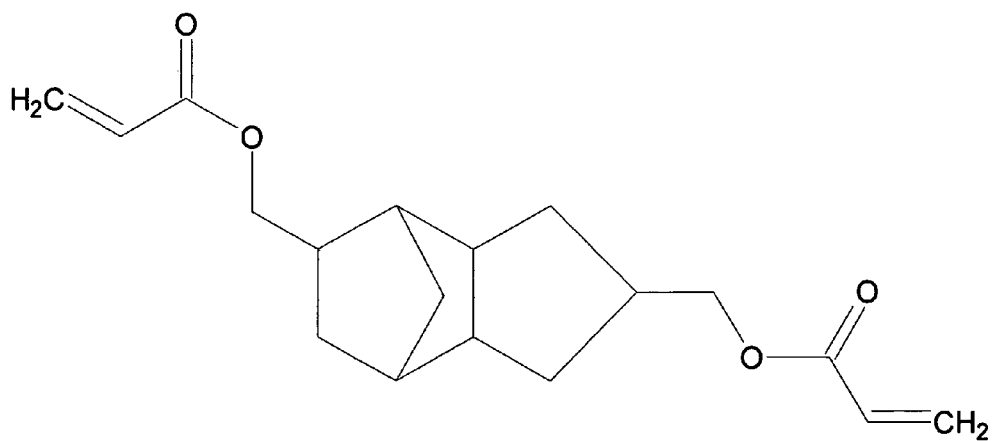

Instead of lauryl acrylate, $1.3 \times 10^{-4}$ mol/g of a monomer having one polymerizing functional group, and shown in (a) of FIG. 10 was dissolved in the liquid crystals A produced by Merck and having a negative dielectric constant anisotropy; then, $1.3 \times 10^{-5}$ mol/g, equivalent to one tenth of the above amount, of a monomer having two polymerizing functional groups that is a compound having the ring structure of formula (2) of this invention, such as shown in (a) of FIG. 11, was dissolved, and this liquid crystal composition was used to fabricate a 17-inch wide (1280×768 dots) MVA-mode TFT panel, similarly to Example 5.

After irradiation with unpolarized ultraviolet rays at 1 mW/cm² for 1500 mJ/cm², the irradiation condition was switched to 10 mW/cm² and irradiation performed for 7500 mJ/cm², that is, for a total of 9000 mJ/cm². As a result, upon evaluating the amount of alignment anomalies, an extremely satisfactory alignment state was obtained, with no white lines whatsoever, without applying pressure to the liquid crystal panel using a laminator.

When, instead of the monomer having two polymerizing functional groups shown in (a) of FIG. 11, the monomer having two polymerizing functional groups shown in (b) of FIG. 11 was used, similar results were obtained.

Example 8

Figure 12:
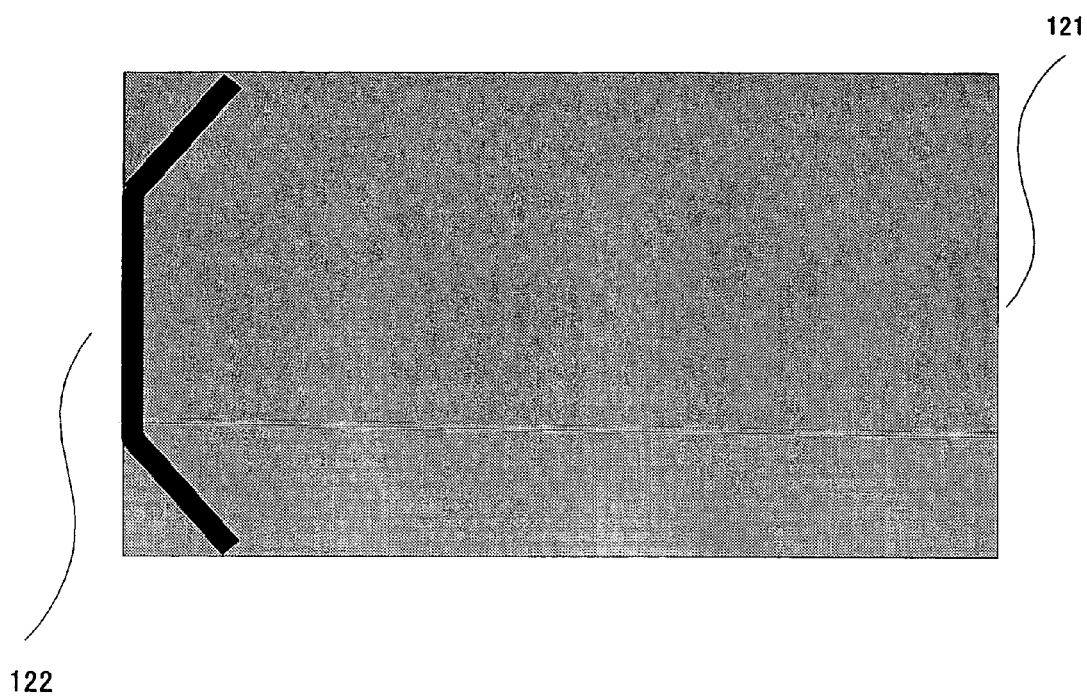
FIG. 12 is a plan view of a panel showing an alignment anomaly in a gray display screen.

In a panel of Example 7, upon displaying gray halftones, "baseless-trapezoid" shaped irregularities such as shown in FIG. 12 appeared. Because these irregularities appeared in the vicinity of the side 122 opposite the side 121 of injection of the liquid crystal composition, it is thought that some foreign matter on the liquid crystal contact face was flushed by the injected liquid crystal composition, and at high concentrations, acted to lower the retention.

By changing the liquid crystal material to liquid crystals B manufactured by Merck, having a negative dielectric constant anisotropy and with high voltage retention, the irregularities could be alleviated.

Next, after irradiation at an intensity of 1 mW/cm² for 1500 mJ/cm² (first process, equivalent to ultraviolet irradiation under the above first condition), the backlight of the panel unit was installed without inserting a polarizing plate such that light would be incident directly from the TFT side, and light was made incident continuously for two hours (new third process, equivalent to the ultraviolet irradiation of the above third condition). Then, irradiation was performed at an intensity of 10 mW/cm² for 7500 mJ/cm² (second process, equivalent to ultraviolet irradiation under the above second condition), as a result of which, even when the conventional liquid crystals A were used, there were no "baseless-trapezoid" shaped irregularities, and complete improvement was achieved. This is attributed to further progress of the monomer reaction, so that the fraction of unreacted material remaining was reduced, as well as to formation of the polymer compounds as a more dense film.

What is claimed is:

1. A method for manufacture of a liquid crystal display device, in which a liquid crystal composition comprising liquid crystal molecules and a polymerizable compound which undergoes polymerization under the action of light or a combination of light and heat and which can align said liquid crystal molecules in the vertical direction, is placed between two substrates, after which ultraviolet irradiation is performed to polymerize the polymerizable compound, thus forming a liquid crystal layer, wherein:
    said ultraviolet irradiation comprises a first ultraviolet irradiation stage and a second ultraviolet irradiation stage after the first ultraviolet irradiation stage; and
    the rate of polymerization in the second ultraviolet irradiation stage is higher than the rate of polymerization in the first ultraviolet irradiation stage.

2. The method for manufacture of a liquid crystal display device according to claim 1, wherein prior to said first ultraviolet irradiation stage, or between said first and second ultraviolet irradiation stages, a third ultraviolet irradiation stage is performed in which the polymerization rate is lower than the polymerization rate in said first ultraviolet irradiation stage.

3. The method for manufacture of a liquid crystal display device according to claim 1, wherein conditions of said stages of ultraviolet irradiation relating to the polymerization rate are determined in terms of ultraviolet radiation wavelength, or ultraviolet radiation intensity, or temperature, or a combination thereof.

4. A method for manufacture of a liquid crystal display device, in which a liquid crystal composition comprising liquid crystal molecules and a polymerizable compound which undergoes polymerization under the action of light or a combination of light and heat and which can align said liquid crystal molecules in the vertical direction, is placed between two substrates, after which ultraviolet irradiation is performed to polymerize the polymerizable compound, thus forming a liquid crystal layer, comprising:
heating the liquid crystal layer to a vicinity of a phase transition point of said liquid crystal molecules from a liquid crystal state to an isotropic state midway through said ultraviolet irradiation.

5. A method for manufacture of a liquid crystal display device, in which a liquid crystal composition comprising liquid crystal molecules and a polymerizable compound which undergoes polymerization under the action of light or a combination of light and heat and which can align said liquid crystal molecules in the vertical direction, is placed between two substrates, after which ultraviolet irradiation is performed to polymerize the polymerizable compound, thus forming a liquid crystal layer, comprising:
deforming said substrates midway through said ultraviolet irradiation.

6. A method for manufacture of a liquid crystal display device, in which a liquid crystal composition comprising liquid crystal molecules and a polymerizable compound which undergoes polymerization under the action of light or a combination of light and heat and which can align said liquid crystal molecules in the vertical direction, is placed between two substrates, after which ultraviolet irradiation is performed to polymerize the polymerizable compound, thus forming a liquid crystal layer; wherein
said liquid crystal composition comprises a compound having the structure of the following formula (1):

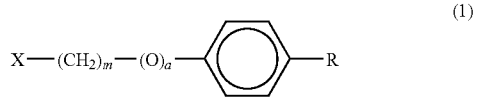

(where X is an acrylate group or a methacrylate group; R is an alkyl group or an alkoxy group, with the number of carbon atoms in either the alkyl group or the alkoxy group being between 1 and 18, or R is an alkyl group or an alkoxy group, with the number of carbon atoms in either the alkyl group or the alkoxy group being between 1 and 18 where a portion of the carbon atoms or hydrogen atoms is replaced by other atoms or molecules; a is 0 or 1; and m is an integer between 0 and 2).

7. The method for manufacture of a liquid crystal display device according to claim 6, wherein a=0.

8. The method for manufacture of a liquid crystal display device according to claim 7, wherein m=0.

9. The method for manufacture of a liquid crystal device according to claim 4, wherein:
said ultraviolet irradiation comprises a first ultraviolet irradiation stage and a second ultraviolet irradiation stage after the first ultraviolet irradiation stage; and
the rate of polymerization in the second ultraviolet irradiation stage is higher than the rate of polymerization in the first ultraviolet irradiation stage.

10. The method for manufacture of a liquid crystal display device according to claim 5, wherein:
said ultraviolet irradiation comprises a first ultraviolet irradiation stage and a second ultraviolet irradiation stage after the first ultraviolet irradiation stage; and
the rate of polymerization in the second ultraviolet irradiation stage is higher than the rate of polymerization in the first ultraviolet irradiation stage.

11. The method for manufacture of a liquid crystal display device according to claim 6, wherein:
said ultraviolet irradiation comprises a first ultraviolet irradiation stage and a second ultraviolet irradiation stage after the first ultraviolet irradiation stage; and
the rate of polymerization in the second ultraviolet irradiation stage is higher than the rate of polymerization in the first ultraviolet irradiation stage.

12. The method for manufacture of a liquid crystal display device according to claim 9, wherein prior to said first ultraviolet irradiation stage, or between said first and second ultraviolet irradiation stages, a third ultraviolet irradiation stage is performed in which the polymerization rate is lower than for the polymerization rate in said first ultraviolet irradiation stage.

13. The method for manufacture of a liquid crystal display device according to claim 9, wherein conditions of said stages of ultraviolet irradiation relating to the polymerization rate are determined in terms of ultraviolet radiation wavelength, or ultraviolet radiation intensity, or temperature, or a combination thereof.

14. The method for manufacture of a liquid crystal display device according to claim 5, comprising:
processing to activate the molecular motion of the liquid crystal molecules midway through said ultraviolet irradiation.

15. The method for manufacture of a liquid crystal display device according to claim 6, comprising:
processing to activate the molecular motion of the liquid crystal molecules midway through said ultraviolet irradiation.

16. The method for manufacture of a liquid crystal display device according to claim 14, wherein said activation processing is heating of the liquid crystal layer to the vicinity of a phase transition point of said liquid crystal molecules from a liquid crystal state to an isotropic state.

17. The method for manufacture of a liquid crystal display device according to claim 6, comprising:
processing to deform said liquid crystal layer midway through said ultraviolet irradiation.

18. The method for manufacture of a liquid crystal display device according to claim 1, wherein
said liquid crystal composition comprises a compound having the structure of the following formula (2):

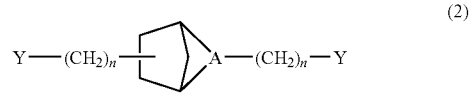

(where Y is an acrylate group or a methacrylate group, A is an aromatic ring which may have a substituent, an alicyclic ring which may have a substituent, or a group of an aliphatic chain which may have branches, and n is an integer of 0 or 1).

19. The method for manufacture of a liquid crystal display device according to claim 4, wherein
said liquid crystal composition comprises a compound having the structure of the following formula (2):

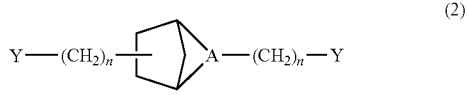
(2)

(where Y is an acrylate group or a methacrylate group, A is an aromatic ring which may have a substituent, an alicyclic ring which may have a substituent, or a group of an aliphatic chain which may have branches, and n is an integer of 0 or 1).

20. The method for manufacture of a liquid crystal display device according to claim 5, wherein
said liquid crystal composition comprises a compound having the structure of the following formula (2):

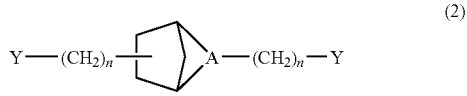
(2)

(where Y is an acrylate group or a methacrylate group, A is an aromatic ring which may have a substituent, an alicyclic ring which may have a substituent, or a group of an aliphatic chain which may have branches, and n is an integer of 0 or 1).

21. The method for manufacture of a liquid crystal display device according to claim 6, wherein
said liquid crystal composition comprises a compound having the structure of the following formula (2):

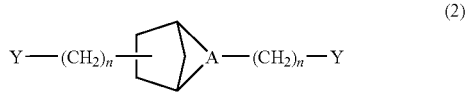
(2)

(where Y is an acrylate group or a methacrylate group, A is an aromatic ring which may have a substituent, an alicyclic ring which may have a substituent, or a group of an aliphatic chain which may have branches, and n is an integer of 0 or 1).

22. The method for manufacture of a liquid crystal display device according to claim 18, wherein n=0.

23. The method for manufacture of a liquid crystal display device according to claim 1, wherein the distances between spacers determining the distance between said substrates are maintained at values equal to or greater than a prescribed value.

24. The method for manufacture of a liquid crystal display device according to claim 4, wherein the distances between spacers determining the distance between said substrates are maintained at values equal to or greater than a prescribed value.

25. The method for manufacture of a liquid crystal display device according to claim 5, wherein the distances between spacers determining the distance between said substrates are maintained at values equal to or greater than a prescribed value.

26. The method for manufacture of a liquid crystal display device according to claim 6, wherein the distances between spacers determining the distance between said substrates are maintained at values equal to or greater than a prescribed value.

27. The method for manufacture of a liquid crystal display device according to claim 23, wherein protruding structures provided on a substrate are used as said spacers.

28. The method for manufacture of a liquid crystal display device according to claims 1 through 27, wherein said liquid crystal molecules have a negative dielectric constant anisotropy, and have the properties of being aligned substantially vertically when no voltage is applied, and being inclined, when a voltage is applied, in directions regulated by protrusions formed on the substrate or by slits in electrodes.

29. A liquid crystal display device, manufactured by a method for manufacture of a liquid crystal display device according to any of claims 1 through 27.

30. A liquid crystal display device, manufactured by a method for manufacture of a liquid crystal display device according to claim 28.

31. The method for manufacture of a liquid crystal display device according to claim 4, wherein said liquid crystal molecules have a negative dielectric constant anisotropy, and have the properties of being aligned substantially vertically when no voltage is applied, and being inclined, when a voltage is applied, in directions regulated by protrusions formed on the substrate or by slits in electrodes.

32. The method for manufacture of a liquid crystal display device according to claim 5, wherein said liquid crystal molecules have a negative dielectric constant anisotropy, and have the properties of being aligned substantially vertically when no voltage is applied, and being inclined, when a voltage is applied, in directions regulated by protrusions formed on the substrate or by slits in electrodes.

33. The method for manufacture of a liquid crystal display device according to claim 6, wherein said liquid crystal molecules have a negative dielectric constant anisotropy, and have the properties of being aligned substantially vertically when no voltage is applied, and being inclined, when a voltage is applied, in directions regulated by protrusions formed on the substrate or by slits in electrodes.

* * * * *